(12) United States Patent   (10) Patent No.: US 9,031,035 B2
Ogawa et al.   (45) Date of Patent: May 12, 2015

(54) TRANSMITTER APPARATUS, RECEIVER APPARATUS, TRANSMISSION METHOD, AND NOTIFICATION METHOD

(75) Inventors: Yoshihiko Ogawa, Kanagawa (JP); Akihiko Nishio, Kanagawa (JP); Seigo Nakao, Kanagawa (JP); Masayuki Hoshino, Kanagawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 338 days.

(21) Appl. No.: 13/639,953

(22) PCT Filed: Apr. 12, 2011

(86) PCT No.: PCT/JP2011/002170
§ 371 (c)(1),
(2), (4) Date: Oct. 8, 2012

(87) PCT Pub. No.: WO2011/135788
PCT Pub. Date: Nov. 3, 2011

(65) Prior Publication Data
US 2013/0114564 A1   May 9, 2013

(30) Foreign Application Priority Data
Apr. 30, 2010   (JP) ................................ 2010-105321

(51) Int. Cl.
*H04L 5/00* (2006.01)
*H04B 7/06* (2006.01)
(Continued)

(52) U.S. Cl.
CPC ............ *H04L 5/0028* (2013.01); *H04L 5/0012* (2013.01); *H04L 5/0016* (2013.01);
(Continued)

(58) Field of Classification Search
CPC ... H04L 5/0028; H04L 5/0092; H04L 5/0082; H04L 1/0009; H04L 1/0003; H04L 5/0012; H04L 5/0023; H04L 5/0048; H04L 5/0016; H04B 7/0413; H04B 7/0689
USPC ......... 370/310, 328, 329, 330, 331, 332, 333, 370/334, 342, 343, 345; 455/403, 422.1
See application file for complete search history.

(56) References Cited

U.S. PATENT DOCUMENTS

| 2007/0053282 A1* | 3/2007 | Tong et al. ................... 370/208 |
| 2010/0103949 A1* | 4/2010 | Jung et al. ................... 370/468 |
| 2011/0026482 A1* | 2/2011 | Li et al. ...................... 370/329 |

OTHER PUBLICATIONS

TS36.331 v8.8.0 "3GPP TSG RAN; E-UTRA Radio Resource Control (RRC); Protocol specification", Dec. 2009.

(Continued)

*Primary Examiner* — Obaidul Huq
(74) *Attorney, Agent, or Firm* — Pearne & Gordon LLP

(57) ABSTRACT

This invention relates to a transmitter apparatus, a receiver apparatus, a transmission method and a notification method that, when a switching between MIMO communication and non-MIMO communication is performed, can suppress the increase of an SRS (Sounding Reference Signal) resource, while suppressing the degradation of trackability of temporal variation of a channel. In a terminal (200), a mapping unit (212) maps an SRS sequence, which is received from a pilot, generating unit (216), on the basis of information related to an SRS hopping pattern, received from a base station (100). For this SRS hopping pattern, the frequency of the SRS transmissions via a first one of a plurality of antennas of the terminal (200) is higher than that of the SRS transmissions via a second one of the plurality of antennas of the terminal (200).

7 Claims, 14 Drawing Sheets

(51) Int. Cl.
  *H04L 1/00* (2006.01)
  *H04B 7/04* (2006.01)
(52) U.S. Cl.
  CPC ............ *H04L5/0023* (2013.01); *H04L 5/0048* (2013.01); *H04B 7/0413* (2013.01); *H04B 7/0689* (2013.01); *H04L 1/0003* (2013.01); *H04L 1/0009* (2013.01); *H04L 5/0082* (2013.01); *H04L 5/0092* (2013.01)

(56) References Cited

OTHER PUBLICATIONS

TS36.211 v8.9.0 "3GPP TSG RAN; Evolved Universal Terrestrial Radio Access (E-UTRA); Physical Channels and Modulation", Dec. 2009.
R1-102305, DoCoMo, "Views on SRS Enhancement for LTE-Advanced", Apr. 12-16, 2010.
International Search Report for PCT/JP2011/002170 dated Jun. 14, 2011.
Mitsubishi Electric, UL Sounding RS Control Signaling for Closed Loop Antenna Selection, 3GPP RAN WG1 #51bis, R1-080017, Jan. 14, 2008, Figure 3.
Motorola, Views on SRS Enhancements for LTE-A, 3GPP TSG RAN WG1 #60bis, R1-102142, Apr. 12, 2010.
Qualcomm Incorporated, SRS Enhancements for LTE-A, 3GPP TSG RAN1 WG1 #60bis, R1-102341, Apr. 12, 2010.
Wuyuan Li, et al., A New Transmit Diversity Method Based on Waterouring Principle in Multiple Antennas Systems, Proceedings of the 2010 2nd International Conference on Information Science and Engineering (ICISE), Dec. 4, 2010.
Extended European Search Report for Application No. 11774578.6 dated Oct. 30, 2014.
R1-081274, Mitsubishi Electric, "Physical layer parameters to specify for transmit antenna selection: Summary of remaining UL SRS related issues and way forward", Mar. 26, 2008.
R1-074540, Mitsubishi Electric, "UL Sounding RS Control Signaling for Closed Loop Antenna Selection", Oct. 30, 2007.
R1-073356, Mitsubishi Electric, "UL Sounding RS Protocol Design for Antenna Selection", Aug. 15, 2007.

\* cited by examiner

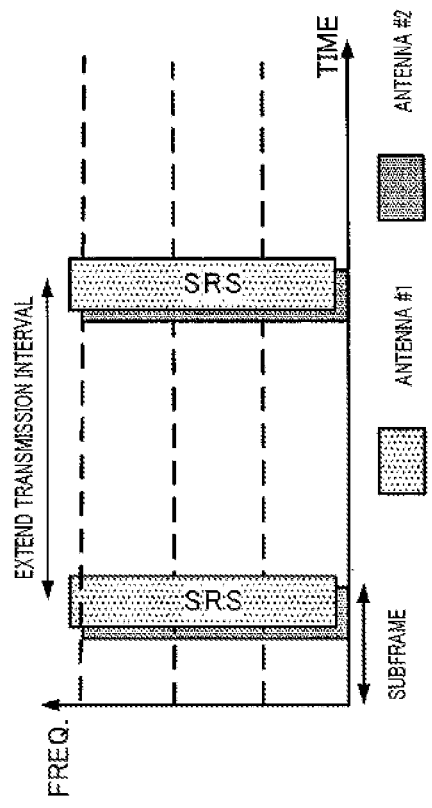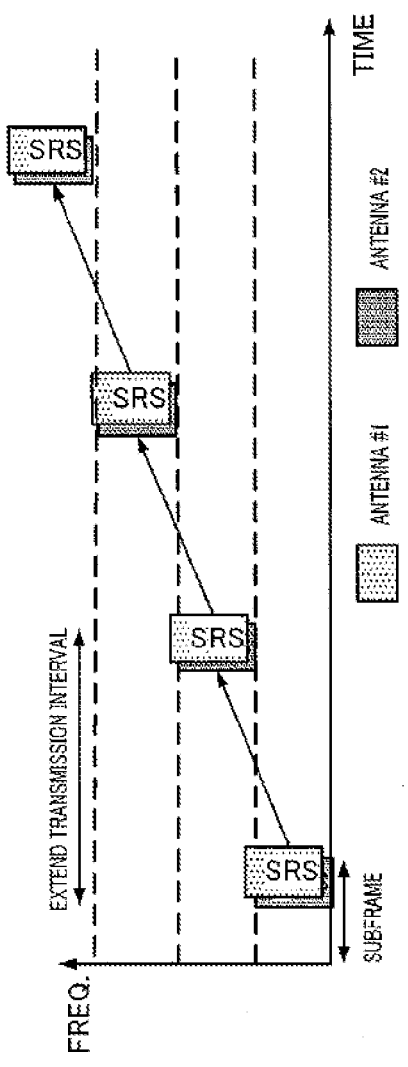
FIG.3A
FIG.3B

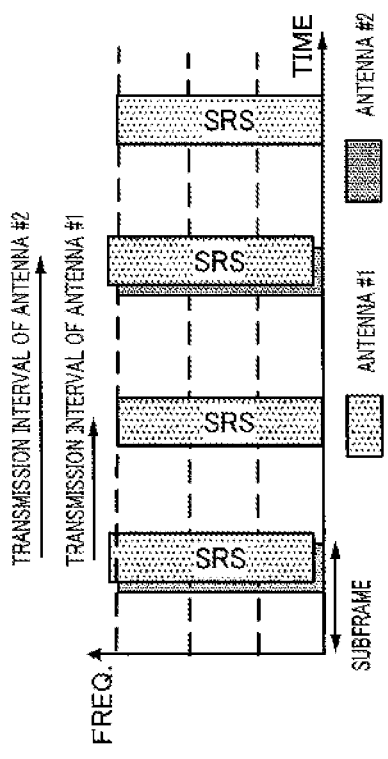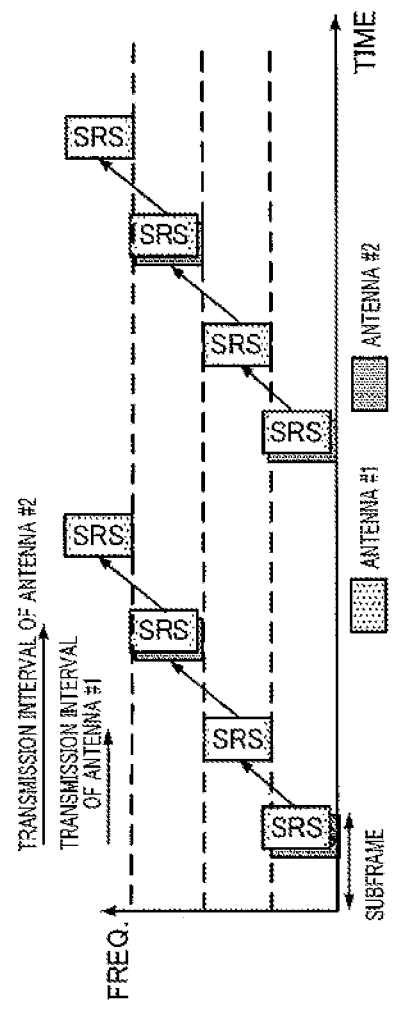

TRANSMITTER APPARATUS, RECEIVER APPARATUS, TRANSMISSION METHOD, AND NOTIFICATION METHOD

TECHNICAL FIELD

The present invention relates to a transmission apparatus, a reception apparatus, a transmission method, and a notification method for a reference signal.

BACKGROUND ART

In an uplink of 3rd Generation Partnership Project Long-Term Evolution (3GPP LTE) (hereinafter, referred to as LTE), a sounding reference signal (SRS) is used to measure reception quality (see NPLs 1 and 2).

The SRSs transmitted from terminals are multiplexed in a time-division, frequency-division, or code-division manner, In addition, an SRS is transmitted at periodic intervals. Particularly, when SRSs are code-division multiplexed in the same time/frequency, an orthogonal cyclic shift sequence is used. Hereinafter, the resources which are specified by time, frequency, and code and to which the SRSs are mapped may be referred to as SRS resources.

Methods of transmitting an SRS are classified into wideband transmission and narrowband transmission. In wideband transmission, the SRS is transmitted through a wide band at one point of time. In narrowband transmission, the SRS is transmitted through a narrow band at one point of time. Therefore, employing frequency hopping in the narrowband transmission and sequentially changing the transmission band enables an SRS transmission at a band equivalent to a wide band (see FIG. 1) Parameters necessary for transmitting the SRS (that is, SRS parameters) are notified as broadcast information or RRC control information to a terminal from a base station in an upper layer. The SRS parameters include an SRS transmission band, an SRS transmission interval, a cyclic shift number of a cyclic shift sequence multiplied by the SRS, and the like.

In LTE-Advanced (hereinafter, referred to as LTE-A), Single User-Multiple Input Multiple Output (SU-MIMO) is a communication system that uses 4×4 transmitting and receiving antennas and has been studied as a communication system applied to an uplink. Employing this MIMO communication system can enhance a data rate. When the MIMO system is employed, it is necessary to estimate channels of antennas of an antenna pair including a transmitting antenna and a receiving antenna. That is, when the MIMO system is employed, it is necessary to transmit the SRSs from. the transmitting antennas in a time-division, frequency-division, or code-division manner.

CITATION LIST

Patent Literature

NPL 1
TS36.331 v8.8.0 "3GPP TSG RAN; E-UTRA Radio Resource Control (RRC); Protocol specification"
NPL 2
TS36.211 v8.9.0 "3GPP TSG RAN; Evolved Universal Terrestrial Radio Access (E-UTRA); Physical Channels and Modulation"
NPL 3
R1-102305, DoCoMo, "Views on SRS Enhancement for LTE-Advanced"

SUMMARY OF THE INVENTION

Technical Problem

In LTE-A, the following methods have been studied as the method of transmitting an SRS.

In a first transmission method, LTE defined SRS parameters arc basically used as common parameters common to a plurality of transmitting antennas. That is, a plurality of transmitting antennas transmit a plurality of SRSs matched to each other in transmission bands, transmission bandwidths, and transmission intervals. Here, the cyclic shift numbers of the cyclic shift sequence by which the SRSs are multiplied are different among the plurality of transmitting antennas. For example, in NPL 3, a plurality of SRSs transmitted from a plurality of transmitting antennas are code-division multiplexed in the same time/frequency and are transmitted using a common frequency hopping pattern.

However, in the first transmission method, since the SRS resources increase in proportion to the number of transmitting antennas as shown in FIG. 2, there is a problem in that resources available for the other channels may be reduced. FIG. 2A is a diagram illustrating a situation where SRSs are transmitted when there is no frequency hopping, and FIG. 2B is a diagram illustrating a situation where SRSs are transmitted when there is frequency hopping.

In contrast to the first method, a second method is a method that reduces the number of SRS resources per unit time by extending the SRS transmission intervals as compared with the first transmission method (see NPL 3). For example, it is possible to reduce the SRS resources by extending the SRS transmission intervals in each transmitting antenna using the LTE defined SRS parameters (e.g., transmission interval).

However, when the SRS transmission interval is extended, as shown in FIG. 3, it may not be possible to follow temporal variation of a channel. That is, the measurement error of reception quality using SRSs may increase. FIG. 3A is a diagram illustrating a situation where SRSs are transmitted when there is no frequency hopping, and FIG. 3B is a diagram illustrating a situation in which SRSs are transmitted when there is a frequency hopping.

An object of the invention is to provide a transmission apparatus, a reception apparatus, a transmission method, and a notification method that can limit a decrease in the following capability of temporal variation of a channel and limit an increase in SRS resources.

Solution to Problem

According to one aspect of the invention, there is provided a transmission apparatus including a plurality of antennas and transmitting a reference signal from each of the antennas, the apparatus including: a mapping section that maps the reference signal to a time-frequency resource on the basis of a hopping pattern of the reference signal; and a transmitting section that transmits the mapped reference signal, wherein in the hopping pattern, the number of transmissions of the reference signal from a first antenna out of the plurality of antennas is larger than the number of transmissions of the reference signal from a second antenna.

According to another aspect of the invention, there is provided a reception apparatus that receives reference signals transmitted from a plurality of antennas of a transmission apparatus, the reception apparatus including: a setting section that sets a hopping pattern of each of the reference signals for the transmission apparatus; and a transmitting section that transmits information on the set hopping pattern to the transmission apparatus, in which, in the hopping pattern, the number of transmissions of the reference signal from a first antenna out of the plurality of antennas is larger than the number of transmissions of the reference signal from a second antenna.

According to still another aspect of the invention, there is provided a transmission method of transmitting reference signals from a plurality of antennas, the method including: transmitting the reference signals mapped to time-frequency resources on the basis of hopping patterns of the reference signals, the hopping patterns being set so that the number of transmissions of the reference signal from a first antenna out of the plurality of antennas is larger than the number of transmissions of the reference signal from a second antenna.

According to still another aspect of the invention, there is provided a notification method of notifying a counterpart communication apparatus of information on reference signals transmitted from a plurality of antennas of the counterpart communication apparatus, the method including: transmitting, to the counterpart communication apparatus, information on hopping patterns which are set so that the number of transmissions of the reference signal from a first antenna out of the plurality of antennas is larger than the number of transmissions of the reference signal from a second antenna.

Advantageous Effects of the Invention

According to the invention, it is possible to provide a transmission apparatus, a reception apparatus, a transmission method, and a notification method that can limit a decrease in the following capability of temporal variation of a channel and limit an increase in SRS resources.

BRIEF DESCRIPTION OF DRAWINGS

FIG. 3 is another diagram illustrating a situation in which SRSs are transmitted;

FIG. 6 is a diagram illustrating SRS hopping pattern 1;

DESCRIPTION OF EMBODIMENTS

Hereinafter, embodiments of the invention will be described with reference to the accompanying drawings. In the embodiments, the same elements are referenced by the same reference signs and description thereof will not be repeated.

Embodiment 1

Summary of System

A communication system including base station 100 and terminal 201) to be described later performs communications using a plurality of downlink unit bands (i.e., CC: Component Carrier), that is, communications based on carrier aggregation.

It is also possible to perform communications between base station 100 and terminal 200 without the carrier aggregation depending on allocation of resources to terminal 200 by base station 100.

Hereinafter, a description will be given of an FDD system for LTE and LTE-A. Here, an LTE terminal is capable of using a communication mode using only a single antenna (that is, a non-MIMO communication mode), but an LTE-A terminal can switch a communication mode between a non-MIMO communication mode and a MIMO communication mode. Hereinafter, a description will be given based on an assumption that a single component carrier is used.

Configuration of Base Station 100

Figure 1:
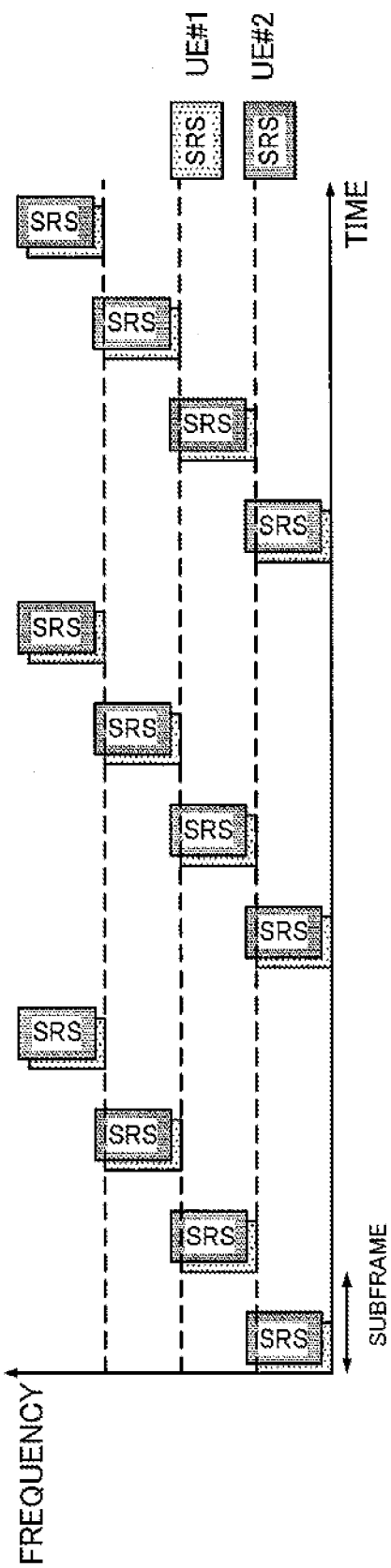
FIG. 1 is a diagram illustrating an SRS transmission method (i.e., wideband transmission and narrowband transmission)
Figure 2A:
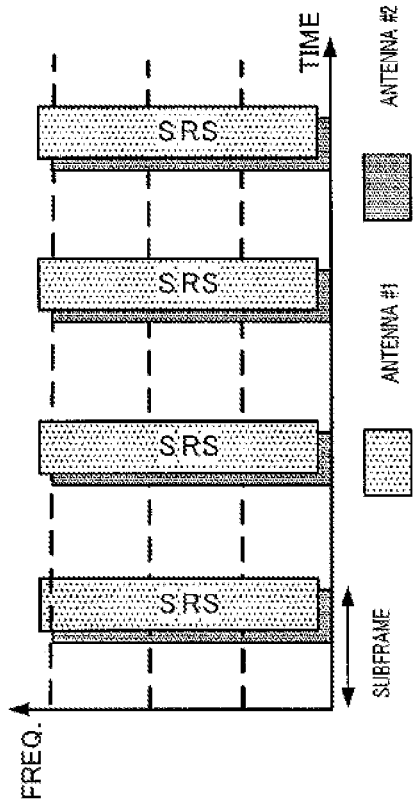
FIG. 2 is a diagram illustrating a situation in which SRSs are transmitted.
Figure 2B:
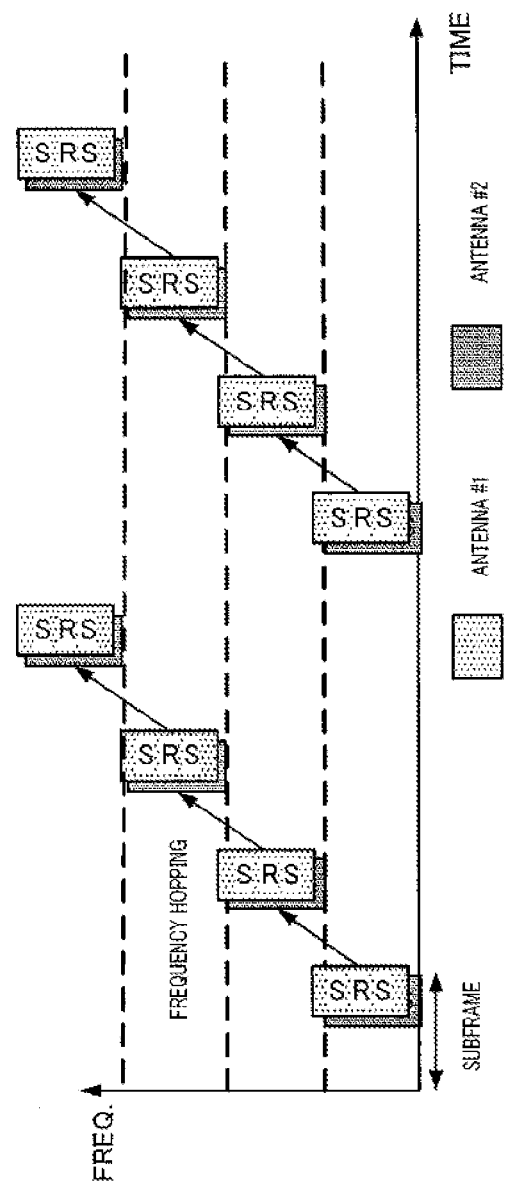
Figure 4:
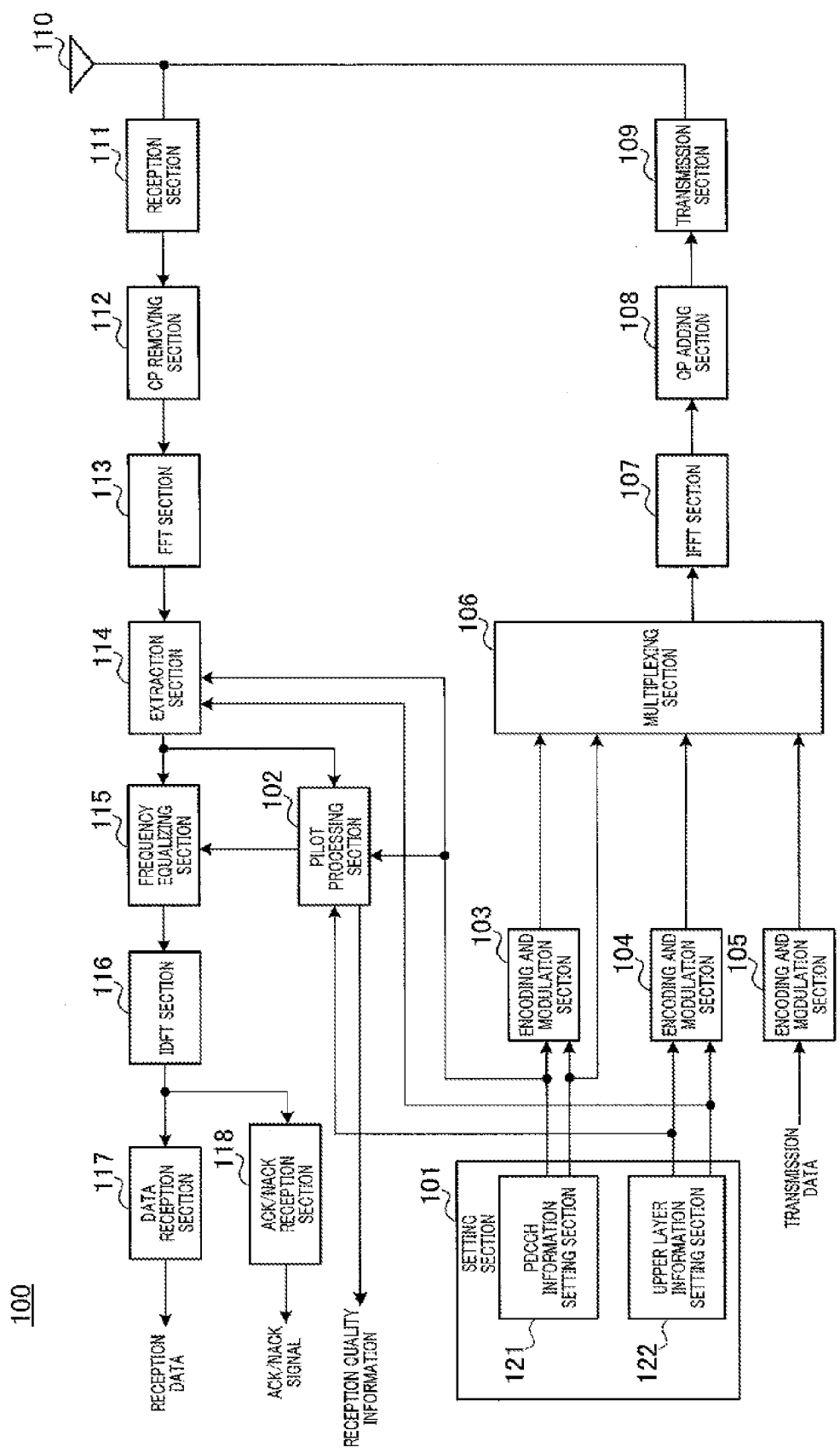
FIG. 4 is a block diagram illustrating the configuration of a base station according to Embodiment 1 of the invention.

FIG. 4 is a block diagram illustrating the configuration of base station 100 according to Embodiment 1 of the invention. In FIG. 4, base station 100 includes setting section 101, pilot processing section 102, encoding and modulation sections 103, 104 and 105, multiplexing section 106, IFFT (Inverse Fast Fourier Transform) section 107, CP (Cyclic Prefix) adding section 108, transmission section 109, antenna 110, reception section 111, CP removing section 112, FFT (Fast Fourier Transform) section 113, extraction section 114, frequency equalizing section 115, IDFT (Inverse Discrete Fourier Transform) section 116, data reception section 117, and ACK/NACK reception section 118. Base station 100 is, for example, an LTE-A base station. In FIG. 4, only one antenna 110 is shown, but a plurality of antennas 110 are provided in practice.

Setting section 101 sets an SRS hopping pattern for each antenna of setting target terminal 200 and generates SRS hopping pattern information. The SRS hopping pattern information is included in SRS parameters. The SRS hopping pattern information at least includes information on a frequency hopping pattern, an SRS transmission start timing, and an SRS transmission interval. The SRS parameters additionally include a cell-specific SRS transmission subframe, a cell-specific SRS transmission band, an SRS transmission bandwidth, a comb number (information related to the transmission band), an SRS transmission period, a hopping bandwidth, and the like. These SRS parameters as the setting information are reported to each terminal as control information (that is, RRC control information) of an upper layer via encoding and modulation section 104 and are outputted to pilot processing section 102 and extraction section 114.

Specifically, setting section 101 sets the number of SRS transmissions from a first antenna out of a plurality of antennas of setting target terminal 200 to be larger than the number of SRS transmissions from a second antenna. That is, the plurality of antennas of setting target terminal 200 include a plurality of antennas having different numbers of SRS transmissions. This is implemented by setting the SRS transmission interval set for the first antenna to be smaller than the SRS transmission interval set for the second antenna.

Here, setting section 101 matches the transmission timing and the frequency position of SRSs transmitted from the second antenna having a relatively smaller number of transmissions with the transmission timing and the frequency position of SRSs transmitted from the first antenna.

Here, various methods can be considered as a method of reporting SRS parameters. For example, the plurality of antennas can share most of the SRS parameters when the frequency hopping patterns of a plurality of antennas of setting target terminal 200 are formed by a part of a plurality of elements that form one reference pattern. Accordingly, in this case, the common parts of the SRS parameters are gathered into a single part and only the different parts may be reported to each antenna. As a result, it is possible to reduce the signaling quantity. For example, when the cyclic shift numbers set for the plurality of antennas of setting target terminal 200 are obtained by sequentially adding a constant offset to the cyclic shift number set for a single antenna as a reference, only the cyclic shift number serving as the reference and the offset value need to be notified. Accordingly, it is possible to reduce the signaling quantity.

Setting section 101 outputs information on a sequence group to pilot processing section 102 and encoding and modulation section 104. The sequence group is set in advance on a per cell basis.

Setting section 101 generates allocation control information for each allocation target terminal. The allocation control information includes: uplink allocation information indicating uplink resources (for example, PUSCH (Physical Uplink Shared Channel)) to which uplink data from the corresponding terminal is allocated; downlink allocation information indicating downlink resources (for example, PDSCH (Physical Downlink Shared Channel)) to which downlink data to the corresponding terminal is allocated; MCS information; HARQ information; and the like.

Setting section 101 generates a PDCCH (Physical Downlink Control Channel) signal that includes the individual allocation control information of the terminals (that is, the allocation control information including the uplink resource allocation information, downlink resource allocation information, the MCS information, the HARQ information and the like for each allocation target terminal).

Specifically, setting section 101 includes PDCCH information setting section 121 and upper layer information setting section 122. PDCCH information setting section 121 generates the allocation control information, and upper layer information setting section 122 sets setting information and the sequence group.

Setting section 101 outputs the cyclic shift number and the SRS transmission bandwidth among the SRS parameters to pilot processing section 102 and outputs the other SRS parameters to extraction section 114. Setting section 101 outputs the allocation control information for each terminal to encoding and modulation section 103. Setting section 101 outputs the uplink resource allocation information out of the allocation control information to extraction section 114 and pilot processing section 102 and outputs the downlink resource allocation information to multiplexing section 106.

SRS hopping patterns will be described in detail later.

Encoding and modulation section 103 performs channel encoding, then modulates the PDCCH signal received as input from setting suction 101 and outputs the modulated PDCCH signal to multiplexing section 106. Here, encoding and modulation section 103 sets a coding rate so as to obtain satisfactory reception quality for each terminal on the basis of a channel quality indicator (CQI) reported from each terminal. For example, encoding and modulation section 103 sets a lower coding rate for a terminal located closer to a cell boundary (that is, a terminal having worse channel quality).

Encoding and modulation section 104 performs channel encoding, then modulates the setting information received as input from setting section 101 and outputs the modulated setting information to multiplexing section 106.

Encoding and modulation section 105 performs channel encoding, then modulates the input transmission data (downlink data) for each component carrier and outputs the modulated transmission data signal to multiplexing section 106.

Multiplexing section 106 multiplexes the PDCCH signal received as input from encoding and modulation section 103, the setting information received as input from encoding and modulation section 104, and the data signal (that is, PDSCH signal) received as input from encoding and modulation section 105 for each component carrier. Multiplexing section 106 maps the PDCCH signal and the data signal (PDSCH signal) on the basis of the downlink resource allocation information input from setting section 101. Multiplexing section 106 may map the setting information on the PDSCH signal. Multiplexing section 106 outputs the multiplexed signal to IFFT section 107.

IFFT section 107 transforms the multiplexed signal input from multiplexing section 106 Into a temporal waveform and outputs the temporal waveform to CP adding section 108.

CP adding section 108 adds a CP to the temporal waveform input from IFFT section 107 to generate an OFDM signal and outputs the generated OFDM signal to transmission section 109.

Transmission section 109 performs a radio transmission process (such as up-conversion, digital-analog (D/A) conversion and the like) on the OFDM signal input from CP adding section 108 and transmits the processed OFDM signal via antenna 110. Here, a single antenna is described but a plurality of antennas may be provided.

Reception section 111 performs a radio reception process (such as down conversion, analog-digital (A/D) conversion and the like) on a received radio signal received in a reception band via antenna 110 and outputs the processed reception signal to CP removing section 112.

CP removing section 112 removes a CP from the reception signal and FFT section 113 transforms the reception signal after the CP removal into a frequency-domain signal.

Extraction section 114 specifies the SRS resources on the basis of the SRS parameters input from setting section 101 and extracts an SRS signal part included in the specified SRS resources from the frequency-domain signal input from FFT section 113. The extracted SRS signal part is output to pilot processing section 102. The SRS signal part other than the extracted SRS signal part in the frequency-domain signal input from FFT section 113 is outputted to frequency equalizing section 115. Regarding the number of times of reception of the SRS transmitted from terminal 200, the number of times of reception of the SRS transmitted from the first antenna out of the plurality of antennas of terminal 200 is greater than the number of times of reception of the SRS transmitted from the second antenna. That is, the reception intervals of the SRS transmitted from the first antenna are shorter than the reception intervals of the SRS transmitted from the second antenna. The reception timing and the reception frequency position of the SRS transmitted from the second antenna having a relatively small number of transmissions are matched with the reception timing and the reception frequency position of the SRS transmitted from the first antenna.

Pilot processing section 102 estimates the channel state between the setting target terminal and the terminal (that is, performs channel estimation) on the basis of the information on the sequence group and the SRS parameters.

Specifically, pilot processing section 102 extracts a sequence using the information on the sequence group and the SRS parameters (particularly, the SRS transmission bandwidth) received from setting section 101. Here, the correspondence between the transmission bandwidth and the sequence as described in NPL 2 is used, for example. Pilot processing section 102 performs a cyclic shift (i.e., phase rotation in the frequency domain, herein) on the extracted sequence on the basis of the SRS parameters (particularly, the cyclic shift number) outputted from setting section 101. Pilot processing section 102 estimates the channel state by multiplying the SRS received from extraction section 114, by a complex conjugate of the sequence having been subjected to the cyclic shift to remove interference components therefrom. The estimated value is outputted to frequency equalizing section 115. In the pilot signals other than the SRS, the cyclic shift amount and the transmission bandwidth may be different from those indicated by the SRS parameters. For example, the cyclic shift amount and the transmission bandwidth may be included in the uplink resource allocation information and notified by the PDCCH signal.

IDFT section 116 transforms the extracted signal into a time-domain signal and outputs the resultant time-domain signal to data reception section 117 and ACK/NACK reception section 118.

Data reception section 117 decodes the time-domain signal input from IDFT 116. Data reception section 117 outputs the decoded uplink data as reception data.

ACK/NACK reception section 118 extracts an ACK/NACK signal for the downlink data from the time-domain signal received from IDFT section 116 and determines ACK/NACK on the extracted ACK/NACK signal.

Configuration of Terminal 200

Figure 5:
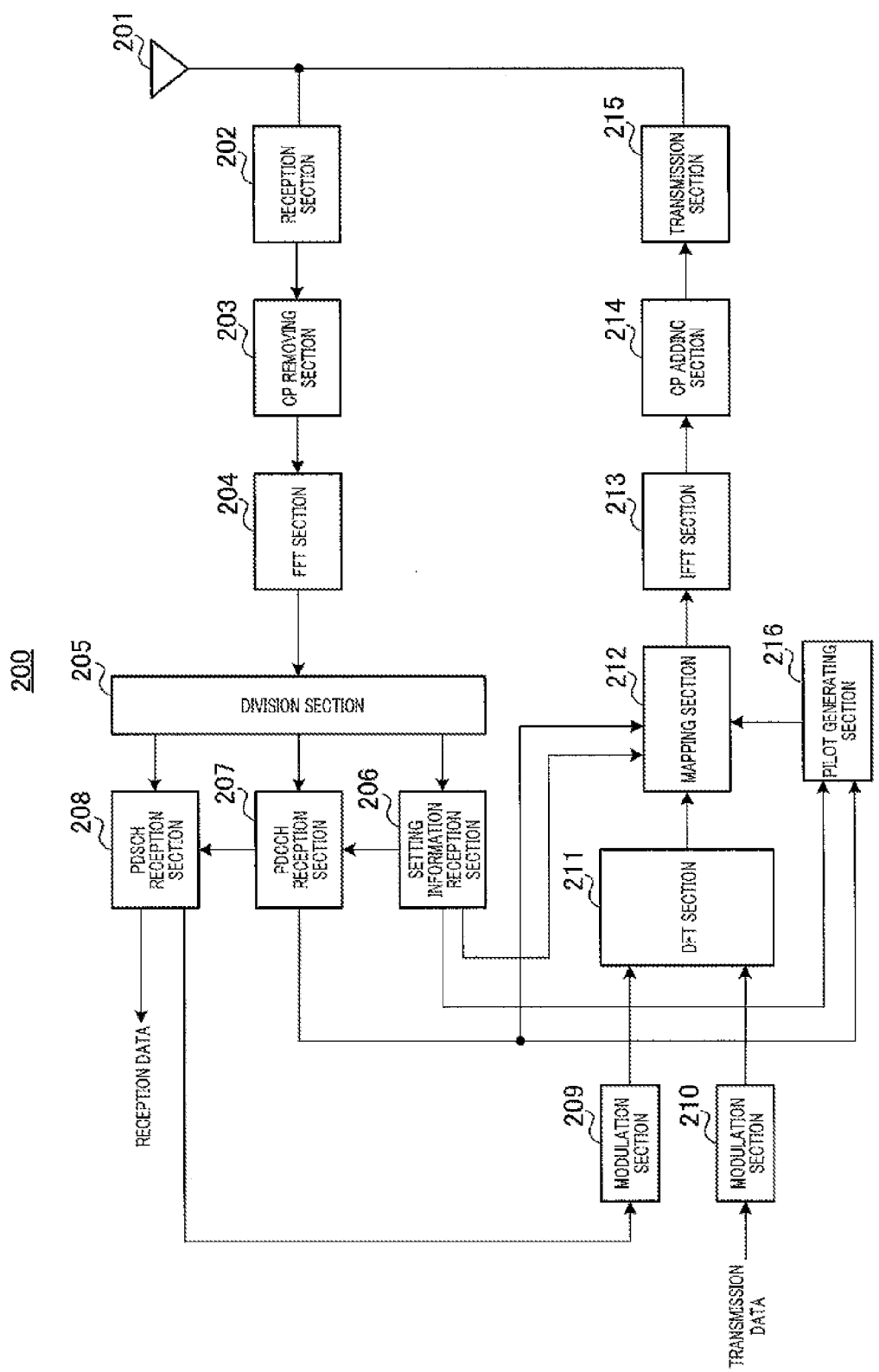
FIG. 5 is a block diagram illustrating the configuration of a terminal according to Embodiment 1 of the invention.

FIG. 5 is a block diagram illustrating the configuration of terminal 200 according to Embodiment 1 of the invention. In FIG. 5, terminal 200 includes antenna 201, reception section 202, CP removing section 203, FFT section 204, demultiplexing section 205, setting information reception section 206, PDCCH reception section 207, PDSCH reception section 208, modulation sections 209 and 210, DFT (Discrete Fourier Transform) section 211, mapping section 212, IFFT section 213, CP adding section 214, transmission section 215, and pilot generating section 216. Terminal 200 is, for example, an LTE-A terminal. In FIG. 5, single antenna 201 is shown, but a plurality of antennas 201 may be provided.

Reception section 202 performs a radio reception process (such as down-conversion, analog-digital (A/D) conversion) and the like on a radio reception signal (i.e., OFDM signal herein) received in a reception band via antenna 201 and outputs the resultant reception signal to CP removing section 203. The reception signal includes upper layer control information including the PDSCH signal, the PDCCH signal, and the setting information.

CP removing section 203 removes the CP from the reception signal, and FFT section 204 transforms the reception signal after the CP removal into a frequency-domain signal, The frequency-domain signal is outputted to demultiplexing section 205.

Demultiplexing section 205 demultiplexes the signal input from FFT section 204 into the upper layer control signal (such RRC signaling), the PDCCH signal, and the data signal (that is, the PDSCH signal). Division section 205 outputs the control signal to setting information reception section 206, outputs the PDCCH signal to PDCCH reception section 207, and outputs the PDSCH signal to PDSCH reception section 208.

Setting information reception section 206 reads the SRS parameters (particularly, the cyclic shift amount and the SRS transmission bandwidth) and the information on the sequence group and outputs the read information to pilot generating section 216. Setting information reception section 206 reads the SRS parameters (particularly, the cell-specific SRS transmission subframe, the cell-specific SRS transmission band, the SRS transmission band, the SRS transmission bandwidth, the Comb number, the transmission timing, the transmission interval, the transmission section, the hopping bandwidth, and the like) and outputs the read SRS parameters to mapping section 212.

PDCCH reception section 207 extracts the PDCCH signal addressed to the terminal from the PDCCH signal received from demultiplexing section 205. PDCCH reception section 207 outputs the downlink resource allocation information included in the PDCCH signal addressed to the terminal to PDSCH reception section 208 and outputs the uplink resource allocation information to mapping section 212 and pilot generating section 216.

PDSCH reception section 208 extracts the reception data (the downlink data) from the PDSCH signal received from the demultiplexing section 205 on the basis of the downlink resource allocation information received from PDCCH reception section 207. PDSCH reception section 208 performs error detection on the extracted reception data (the downlink data). PDSCH reception section 208 generates a NACK signal as the ACK/NACK signal when determining that the reception data has an error, and generates an ACK signal as the ACK/NACK signal when determining that the reception data has no error. The generated ACK/NACK signal is outputted to modulation section 209.

Modulation section 209 modulates the ACK/NACK signal input from PDSCH reception section 208 and outputs the modulated ACK/NACK signal to DFT section 211.

Modulation section 210 modulates the transmission data (that is, the uplink data) and outputs the modulated data signal to DFT section 211.

DFT section 211 transforms the ACK/NACK signal received from modulation section 209 and the data signal received from modulation section 210 into frequency-domain signals and outputs the plurality of frequency components thus obtained to mapping section 212.

Pilot generating section 216 outputs the information on the sequence group and an SRS sequence based on the SRS parameters (particularly, the cyclic shift number and the SRS transmission bandwidth), which are received, from setting information reception section 206.

Specifically, pilot generating section 216 determines the sequence length and the sequence number of the SRS on the basis of the information on the sequence group and the information on the SRS transmission bandwidth, and generates an SRS sequence corresponding to the determined sequence number and sequence length. Pilot generating section 216 performs a cyclic shift on the generated SRS sequence on the basis of the SRS parameters (particularly, the cyclic shift number). Pilot generating section 216 generates a pilot signal other than the SRS. For example, pilot generating section 216 generates a pilot signal for demodulating the data signal, on the basis of the information on the sequence group outputted from setting information reception section 206 and the transmission bandwidth information of the uplink resource allocation information outputted from PDCCH reception section 207. For adding the cyclic shift to the pilot signal, pilot generating section 216 performs the cyclic shift on the pilot signal by the cyclic shift amount included in the uplink resource allocation information.

Mapping section 212 maps the SRS sequence received from pilot generating section 216 on the basis of the SRS hopping pattern information included the SRS parameters received from setting information reception section 206. The SRS hopping patterns for at least some antennas of a plurality of transmitting antennas of terminal 200 are different.

Specifically, mapping section 212 maps the SRS so that the number of SRS transmissions from the first antenna out of the plurality of antennas of terminal 200 is larger than the number of SRS transmissions from the second antenna. That is the plurality of antennas of terminal 200 include a plurality of antennas having different numbers of SRS transmissions. This is accomplished by setting the transmission interval of the SRSs transmitted from the first antenna to be shorter than the transmission interval of the SRSs transmitted from the second antenna.

Mapping section 212 matches the transmission timing and the frequency position for mapping the SRS transmitted from the second antenna having a relatively-small number of transmissions with the transmission timing and the frequency position for mapping the SRS transmitted from the first antenna.

Mapping section 212 maps the frequency component corresponding to the data signal and the frequency component of the pilot sequence received from pilot generating section 216, out of the plurality of frequency components received from DFT section 211 to the PUSCH in accordance with the uplink resource allocation information received from PDCCH reception section 207. Mapping section 212 maps the frequency component corresponding to the ACK/NACK signal out of the plurality of frequency components received from DFT section 211 or the code resource to the PUCCH. Here, the ACK/NACK signal is mapped to the PUCCH, but may be mapped to the PUSCH.

IFFT section 213 transforms the plurality of frequency components mapped by mapping section 212 into a time-domain waveform, and CP adding section 214 adds a CP to the time-domain waveform.

Transmission section 215 is capable of changing the transmission band and sets the transmission band on the basis of the band information received from setting information reception section 206. Transmission section 215 performs a radio transmission process (such as up-conversion, digital-analog (D/A) conversion and the like) on the signal with the CP added thereto and transmits the resultant signal via antenna 201.

Modulation section 209, modulation section 210, DFT section 211, and mapping section 212 may be provided for each component carrier.

Reporting the SRS parameters with the upper layer information (that is, RRC signaling) having a long notification interval can reduce the traffic, when the variation in the traffic state for each cell is small or when an average reception quality is intended to be measured. Moreover, reporting all or a part of the SRS parameters as broadcast information can further reduce the traffic. However, when the notification interval needs to be changed more dynamically in accordance with the traffic situation, it is preferable to use the PDCCH having notification intervals shorter than the RRC signaling, for reporting all or a part of the SRS parameters.

Operations of Base Station 100 and Terminal 200

The operations of base station 100 and terminal 200 having the above-mentioned configurations will be described below. The SRS hopping pattern will be particularly described below.

As described above, base station 100 indicates the SRS hopping pattern to terminal 200, and terminal 200 transmits the SRS on the basis of the indicated SRS hopping pattern.

SRS Hopping Pattern 1

FIG. 6 is a diagram illustrating SRS Hopping Pattern 1. FIG. 6A shows an SRS hopping pattern when the frequency hopping is not employed (that is, the SRS is transmitted in wideband) and FIG. 6B shows an SRS hopping pattern when the frequency hopping is employed.

As shown in FIG. 6, in SRS Hopping Pattern 1, the number of transmissions of an SRS from the first antenna. (antenna #1) out of the plurality of antennas of terminal 200 is larger than the number of transmissions of an SRS from the second antenna (antenna #2).

In SRS Hopping Pattern 1, the transmission timing and the frequency position of the SRS transmitted from the second antenna (antenna #2) having a relatively small number of transmissions are matched with the transmission timing and the frequency position of the SRS transmitted from the first antenna (antenna #1).

In a different perspective, this configuration can be viewed as follows. That is, the SRS hopping pattern of the second antenna is formed by a part of the elements forming the SRS hopping pattern of the first antenna, when the SRS hopping pattern of the first antenna is considered as a reference pattern.

Accordingly, it is possible to limit the increase in SRS resources compared to the above-mentioned conventional first transmission method.

Figure 7:
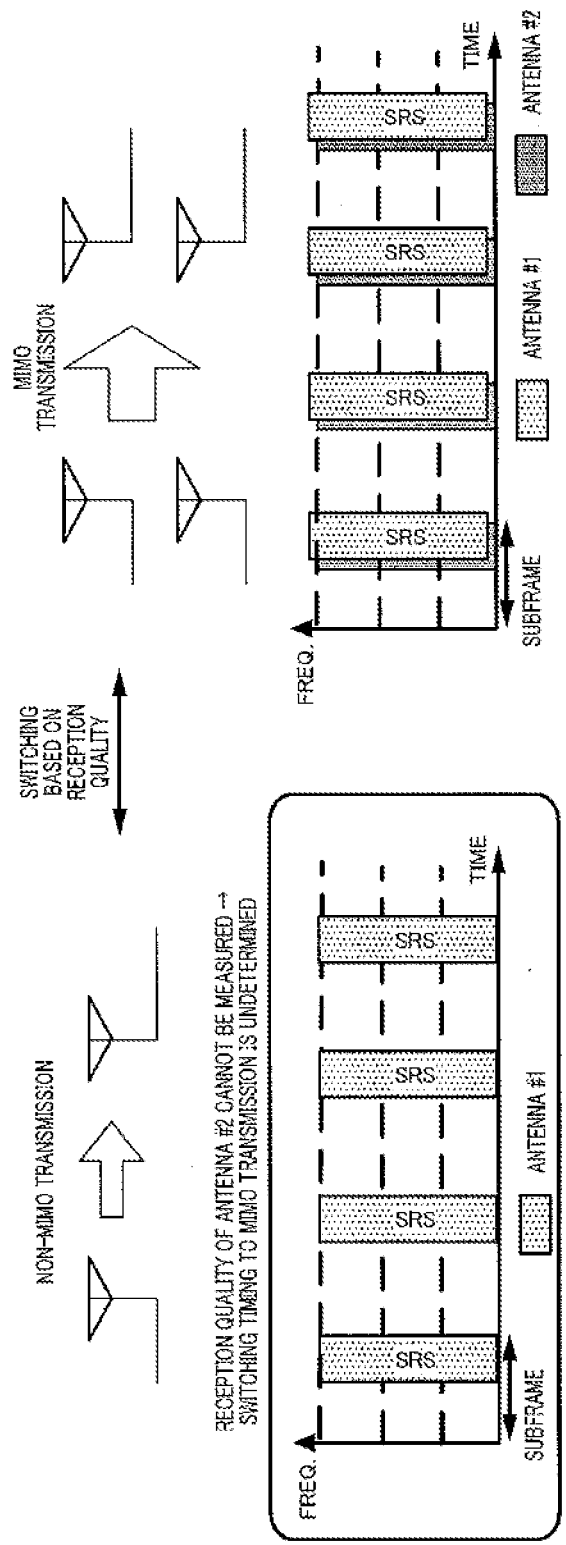
FIG. 7 is a diagram illustrating switching from a non-MIMO communication mode to a MIMO communication mode.

Here, MIMO communication (that is, spatial multiplexing communication using a plurality of antennas) can improve the throughput when the channel state is good. In this respect, it is possible to improve the throughput by performing non-MIMO communication using as single transmitting antenna in the normal state and then switching the communication mode to the MIMO communication that uses a plurality of transmitting antennas, when the reception quality is good. In this case, in order to perform the frequency scheduling (that is, selecting a resource block (RB) having good quality or the like) for data transmission, and MCS control, the reception quality of only one antenna is measured in the non-MIMO communication, while the reception quality of as plurality of antennas is measured in the MIMO communication However, as shown in FIG. 7, when the reception quality of only one antenna is measured, the reception quality of the other antennas is not determined. For this reason, the timing to switch from the non-MIMO communication mode to the MIMO communication mode cannot be determined in this case. That is, in order to switch from the non-MIMO communication mode to the MIMO communication mode, it is necessary to periodically measure the reception quality of the antennas used in the MIMO communication mode while the non-MIMO communication mode is used.

In contrast to the aforementioned case, in SRS Hopping Pattern 1, although the SRS is transmitted from sonic antennas out of the plurality of antennas of terminal 200, the number of SRS transmissions is limited. Accordingly, the decrease in the following capability of temporal variation of a channel can be limited to some antennas.

When the gains of the plurality of amplifiers corresponding to the plurality of antennas of terminal 200 are different, an antenna corresponding to the amplifier having a higher gain may be set as the first antenna and another antenna may be set as the second antenna. Alternatively, when the antenna to be used in the non-MIMO communication mode is determined, that antenna may be set as the first antenna and the additional antenna used in the MIMO communication mode may be set as the second antenna. Accordingly, the first antenna can be considered as a primary antenna.

As described above, according to this embodiment, setting section 101 in base station 100 sets the SRS hopping pattern and generates SRS hopping pattern information for each antenna of setting target terminal 200. The SRS hopping pattern information is transmitted to terminal 200 via transmitting means such as encoding and modulation section 104.

In the set SRS hopping pattern, the number of SRS transmissions from the first antenna out of the plurality of antennas of setting target terminal 200 is larger than the number of SRS transmissions from the second antenna. The transmission timing and the frequency position of the SRS transmitted from the second antenna are matched with the transmission timing and the frequency position of the SRS transmitted from the first antenna.

In terminal 200, mapping section 212 maps the SRS sequence received from pilot generating section 216 on the basis of the SRS hopping pattern information received from base station 100.

In the SRS hopping pattern, the number of SRS transmissions from the first antenna out of the plurality of antennas of setting target terminal 200 is larger than the number of SRS transmissions from the second antenna. The transmission timing and the frequency position of the SRS transmitted from the second antenna are matched with the transmission timing and the frequency position of the SRS transmitted from the first antenna.

Accordingly, it is possible to limit the decrease in the following capability of temporal variation of a channel and to limit the increase in SRS resources, even when the communication mode is switched between the MIMO communication mode and the non-MIMO communication mode.

Particularly, the measurement error of reception quality due to the difference in time and frequency is small in the case of resources using same time and the same frequency for transmitting the SRSs from the first antenna and the second antenna. Accordingly, it is possible to achieve highly-precise setting in setting weights in the MIMO communication or the like. In the time and frequency resources in which an SRS is transmitted from the first antenna but no SRS is transmitted from the second antenna, the number of SRSs code-division multiplexed is small and it is thus possible to reduce the interference between the SRS sequences. As a result, it is possible to estimate the reception quality with a small error.

It is stated above that the SRS hopping pattern used for the first antenna is used as the reference pattern and the SRS hopping pattern used for the second antenna is formed by a part of the elements forming the reference pattern. However, the invention is not limited to this configuration, and the SRS hopping pattern used for each of the first antenna and the second antenna may be formed by a part of the elements forming a reference pattern. In this case, the SRS hopping pattern used for the second antenna is formed by a part of the elements forming the SRS hopping pattern used for the first antenna.

The SRS may be transmitted less frequently from the antenna other than the primary antenna in the non-MIMO communication mode while the SRS may be transmitted more frequently from all the transmitting antennas in the MIMO communication mode. Accordingly, it is possible to measure the channel quality in the MIMO communication mode with high precision.

SRS Hopping Pattern 2

Figure 8:
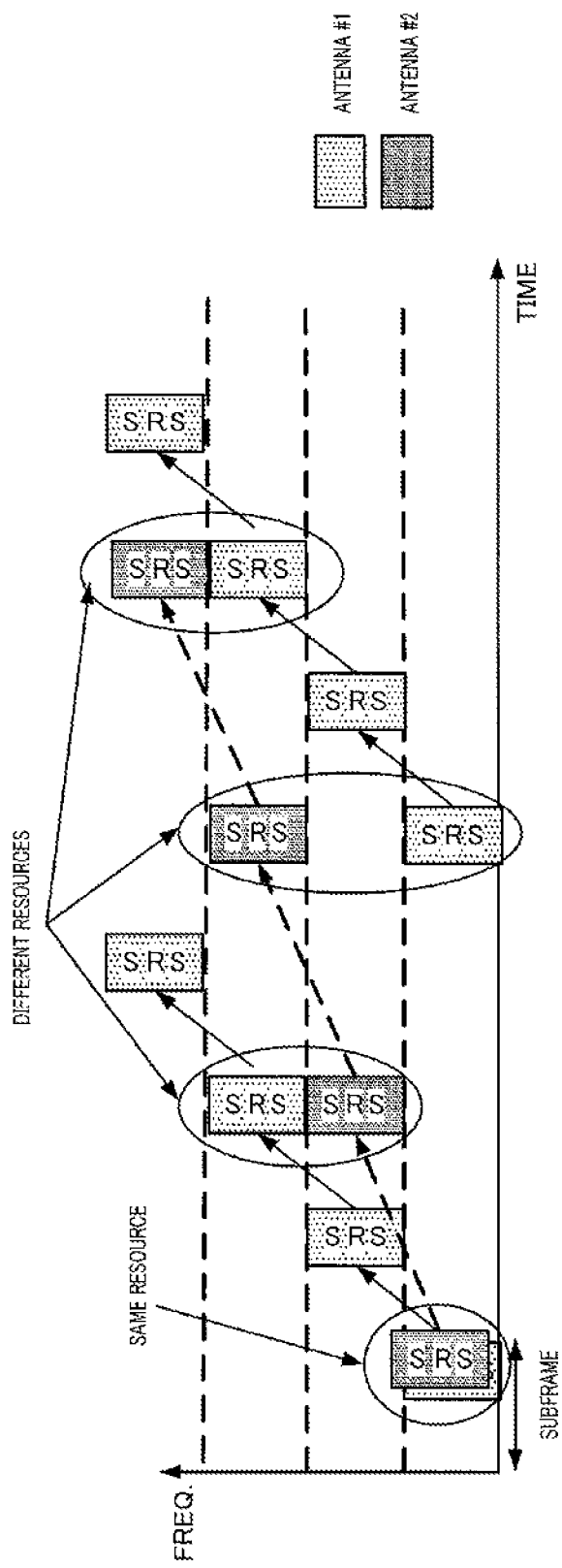
FIG. 8 is a diagram illustrating SRS hopping pattern 2.

It is stated above that both the transmission timings and the frequency positions of the first antenna and the second antenna are matched with each other. However, the invention is not limited to this configuration, and as shown in FIG. 8, as long as the SRS transmission timings of the first antenna and the second antenna are matched with each other, the frequency positions thereof may not be necessarily matched with each other.

SRS Hopping Pattern 3

Both the transmission timings and the frequency positions of the SRSs transmitted from the first antenna and the second antenna may not be matched with each other. In other words, the number of SRS transmissions from the first antenna has only to be larger than the number of SRS transmissions from the second antenna. Accordingly, even when the communication mode is switched between the MIMO communication mode and the non-MIMO communication mode, it is possible to limit the decrease in the following capability of temporal variation of a channel and to limit the increase in SRS resources.

Embodiment 2

Embodiment 2 relates to a variation of the SRS hopping pattern. Specifically, the SRS hopping pattern applied to the second antenna is switched every application cycle of hopping pattern (hereinafter, referred to as "hopping pattern application cycle"). Accordingly, the frequency at which the SRSs are transmitted is dispersed.

The basic configurations of the base station and the terminal according to Embodiment 2 are the same as those of Embodiment 1 and thus will be described with reference to FIGS. 4 and 5.

Setting section 101 of base station 100 according to Embodiment 2 sets an SRS hopping pattern for each antenna of setting target terminal 200 and generates SRS hopping pattern information, similarly to Embodiment 1.

In Embodiment 2, setting section 101, however, switches the SRS hopping pattern applied to the second antenna of setting target terminal 200 every hopping pattern application cycle. The application cycle includes a plurality of subframes. Specifically, setting section 101 sets an SRS hopping pattern applied to the second antenna in a reference application cycle and offset values between the reference SRS hopping pattern and the SRS hopping patterns applied in the application cycles. The SRS hopping pattern used in the reference application cycle and the offset values are included in the SRS hopping pattern information.

The reference application cycle may be the first application cycle or may be the application cycle just before.

Mapping section 212 of terminal 200 according to Embodiment 2 maps the SRS sequence received from pilot generating section 216 on the basis of the SRS hopping pattern information included in the SRS parameters received from setting information reception section 206, similarly to Embodiment 1.

Mapping section 212 of terminal 200 according to Embodiment 2 switches the SRS hopping pattern applied to the second antenna, every hopping pattern application cycle. Specifically, mapping section 212 maps the SRS sequence on the basis of an SRS hopping pattern obtained by cyclically shifting, in an application cycle, the SRS hopping pattern to be used in the reference application, cycle in the time direction by the number of subframes equivalent to the offset value allocated to the application cycle.

The operations of the base station 100 and the terminal 200 having the above-mentioned configurations will be described later.

SRS Hopping Pattern 4

Figure 9:
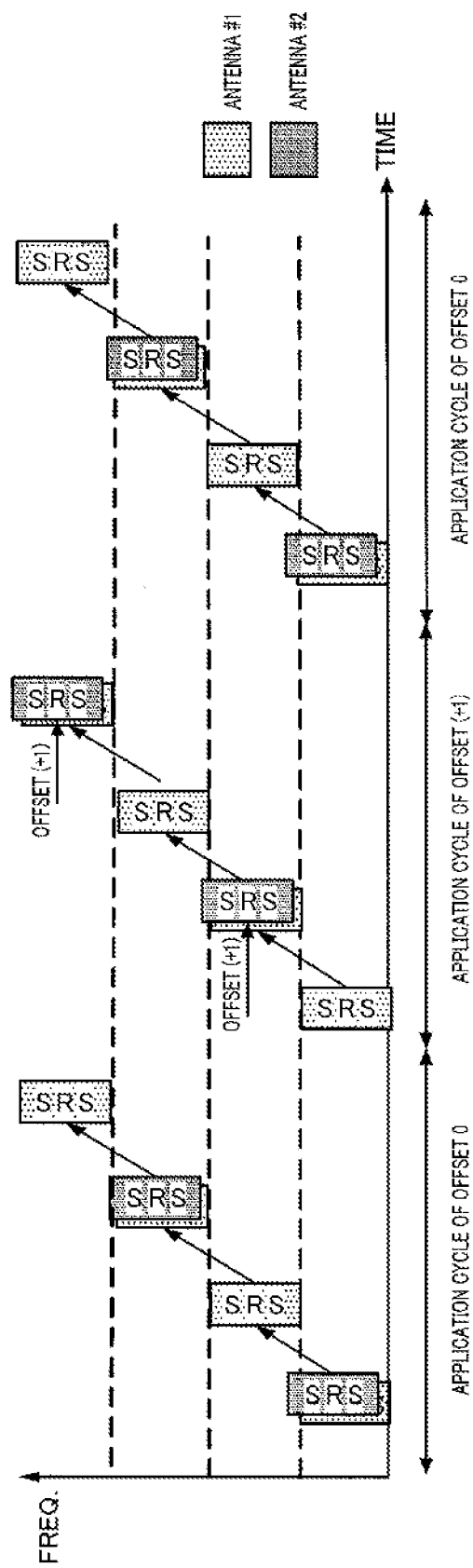
FIG. 9 is a diagram illustrating SRS hopping pattern 4 according to Embodiment 2 of the invention.

FIG. 9 is a diagram illustrating SRS Hopping Pattern 4. As shown in FIG. 9, in SRS Hopping Pattern 4, the SRS hopping pattern applied to the second antenna (antenna #2) is switched every hopping pattern application cycle. In FIG. 9, one application cycle consists of four subframes.

In FIG. 9, in the first application cycle, the SRSs are transmitted in the first subframe and the third subframe. In the subsequent application cycle, since the offset value from the first application cycle is set to 1, the SRSs are transmitted in the second subframe and the fourth subframe. In the third application cycle, since the offset value from the first application cycle is set to 0, the SRSs are transmitted in the first subframe and the third sub frame. That is, in FIG. 9, the application cycle in which the SRSs are transmitted in the odd subframes and the application cycle in which the SRSs are transmitted in the even subframes are alternately repeated.

That is, in FIG. 9, the SRS is transmitted from the first antenna at the same frequency for each application cycle, and the SRS is transmitted from the antennas other than the first antenna at frequencies corresponding to the offset values different for respective application cycles.

Figure 10:
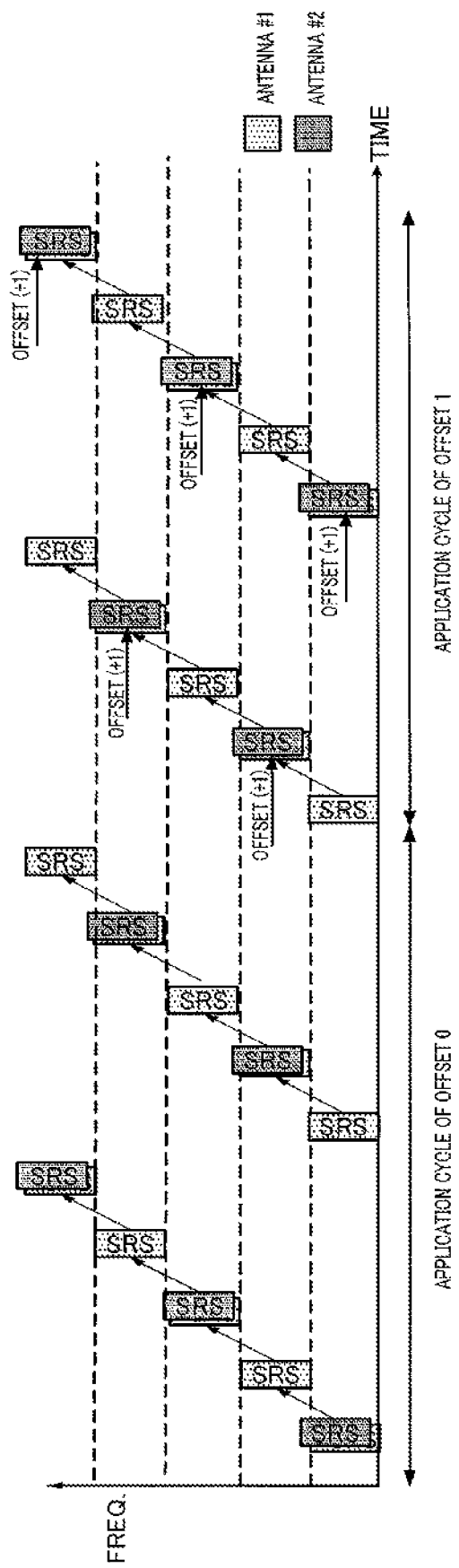
FIG. 10 is a diagram illustrating SRS hopping pattern 4 according to Embodiment 2 of the invention.

In FIG. 9, the frequency band allocated to terminal 200 is divided into four parts, and the number of subframes constituting one application cycle is four, but the combination of the number of partial bands (obtained after division) and the number of subframes in SRS Hopping Pattern 4 is not limited to this. For example, as shown in FIG. 10, the frequency band allocated to terminal 200 may be divided into five parts and the number of subframes constituting one application cycle may be ten.

Figure 11:
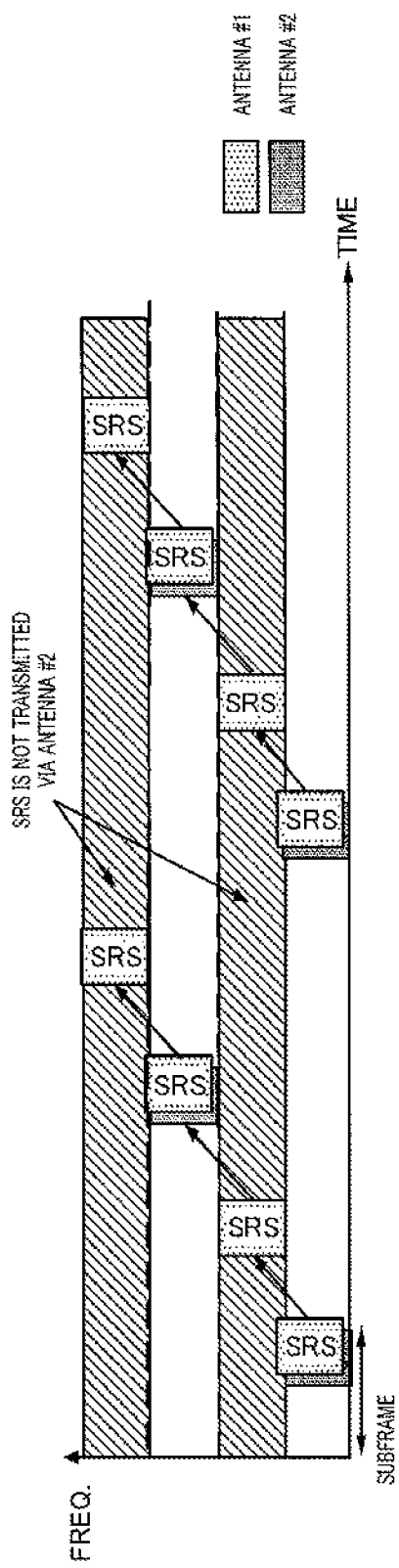
FIG. 11 is a diagram illustrating SRS hopping pattern 1.

As shown in FIG. 11, when the SRS is transmitted from the second antenna at a fixed frequency, the SRS may not be transmitted at all at some frequencies. For example, as shown in FIG. 11, when the frequency band allocated to terminal 200 is divided into even partial bands, the SRS is not transmitted at all from the antennas other than the first antenna in the second partial band and the fourth partial band. A method of covering the entire frequency band allocated to terminal 200 by doubling the frequency band at which the SRS is transmitted from the antennas other than the first antenna can be also considered. However, in this method, a plurality of sequences having different bandwidths are code-division multiplexed, so that the effect of reducing the inter-sequence interference due to the cyclic shift sequence (i.e., orthogonal sequence) is lessened. Accordingly, the measurement error of the reception quality increases. When the transmission band for the SRS is extended, there arises also a problem that the SRS resources increase.

To overcome this problem, use of SRS Hopping Pattern 4 makes it possible to disperse the frequency at which the SRSs are transmitted.

The above application cycle may be set as the time required for the SRSs to be mapped to the entire frequency band with the reference pattern, or may be set as the timing at which the multiple of the transmission interval ratio of the primary antenna and the other antennas becomes a multiple of the number of partial bands of the frequency band allocated to terminal 200. The number of partial bands of the frequency band and the number of elements of the reference pattern may be associated with each other by setting the number of elements of the reference pattern to be equal to the number of partial bands of the frequency band, or the like.

According to this embodiment, the SRS hopping pattern applied to the second antenna is switched every hopping pattern application cycle. Accordingly, the frequency at which the SRSs are transmitted is dispersed.

Embodiment 3

Embodiment 3 relates to a variation of the SRS hopping pattern. Specifically, this hopping pattern includes a mixture of a period in which the SRS is transmitted from the second antenna and a period in which no SRS is transmitted at all from the second antenna.

The basic configurations of the base station and the terminal according to Embodiment 3 are the same as those Embodiment 1 and thus will be described with reference to FIGS. 4 and 5.

Setting section 101 of base station 100 according to Embodiment 3 sets an SRS hopping pattern for each antenna of setting target terminal 200 and generates SRS hopping pattern information, similarly to Embodiment 1.

Setting section 101 of base station 100 according to Embodiment 3 switches the period in which the SRS is transmitted from the second antenna of setting target terminal 200 and the period in which no SRS is transmitted at all from the second antenna. For example, N subframes are set to one period and an SRS transmitting period and a no-SRS transmitting period are switched on a per period basis. This switching can be implemented by setting the SRS transmission interval on a per period basis. The number of subframes N constituting one period may be fixed, or may be notified from base station 100 to terminal 200 using an upper layer, or may be calculated by terminal 200 on the basis of the overall frequency band allocated to the terminal, the bandwidth of the partial band, and the frequency hopping pattern.

Mapping section 212 of terminal 200 according to Embodiment 3 maps the SRS sequence received from pilot generating section 216 on the basis of the SRS hopping pattern information included in the SRS parameters received from setting information reception section 206, similarly to Embodiment 1.

Mapping section 212 of terminal 200 according to Embodiment 3 switches the period in which the SRS is transmitted from the second antenna and the period in which no SRS is transmitted at all from the second antenna.

The operations of base station 100 and terminal 200 having the above-mentioned configurations will be described herein.

SRS Hopping Pattern 5

Figure 12:
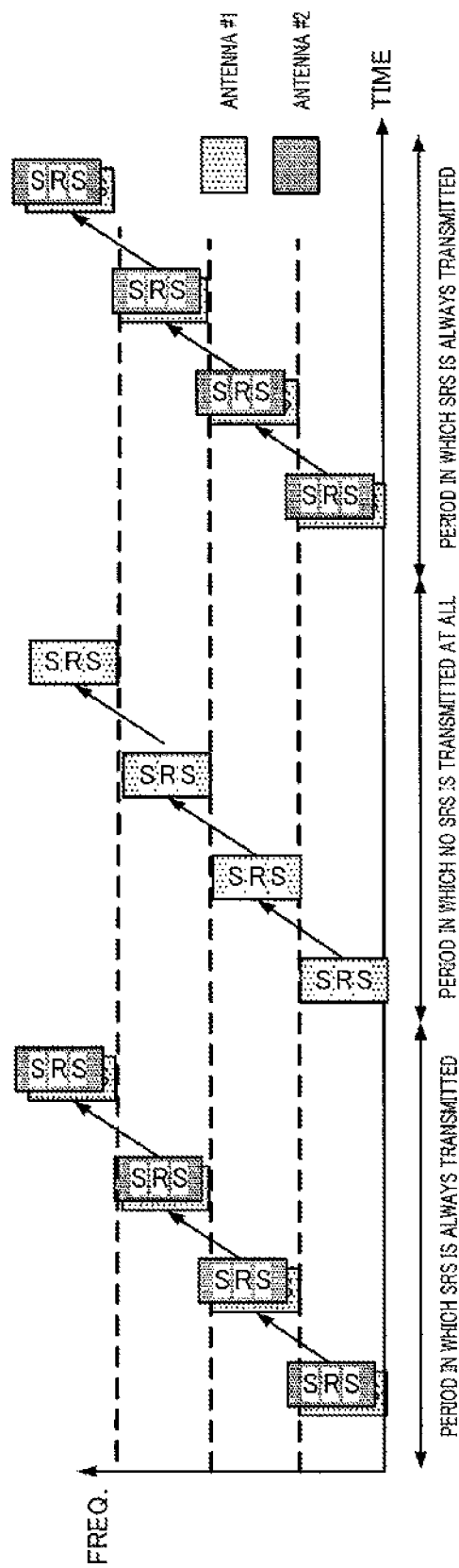
FIG. 12 is a diagram illustrating SRS hopping pattern 5 according to Embodiment 3 of the invention.

FIG. 12 is a diagram illustrating SRS Hopping Pattern 5. As shown in FIG. 12, SRS Hopping Pattern 5 has a mixture of the period in which the SRS is transmitted from the second antenna (antenna #2) and the period in which no SRS is transmitted at all from the second antenna. In FIG. 12, one period consists of four subframes, which corresponds to the application cycle in Embodiment 2. Referring to the SRS transmitting period, the SRS hopping pattern for the first antenna and the SRS hopping pattern for the second antenna are matched with each other in the SRS transmitting period.

This switching between the SRS transmitting period and the no-SRS transmitting period is implemented by causing base station 100 to transmit, to terminal 200, information indicating that the SRS transmission interval from the second antenna has two periods.

Using this SRS hopping pattern allows the antennas of the terminal 200 to have different numbers of SRS transmissions. Similarly to SRS Hopping Pattern 4, the frequency at which the SRSs are transmitted can be dispersed.

Embodiment 4

Embodiment 4 relates to a variation of the SRS hopping pattern. Specifically, the number of SRS transmissions from the second antenna varies depending on the frequency band.

SRS Hopping Pattern 6

Figure 13:
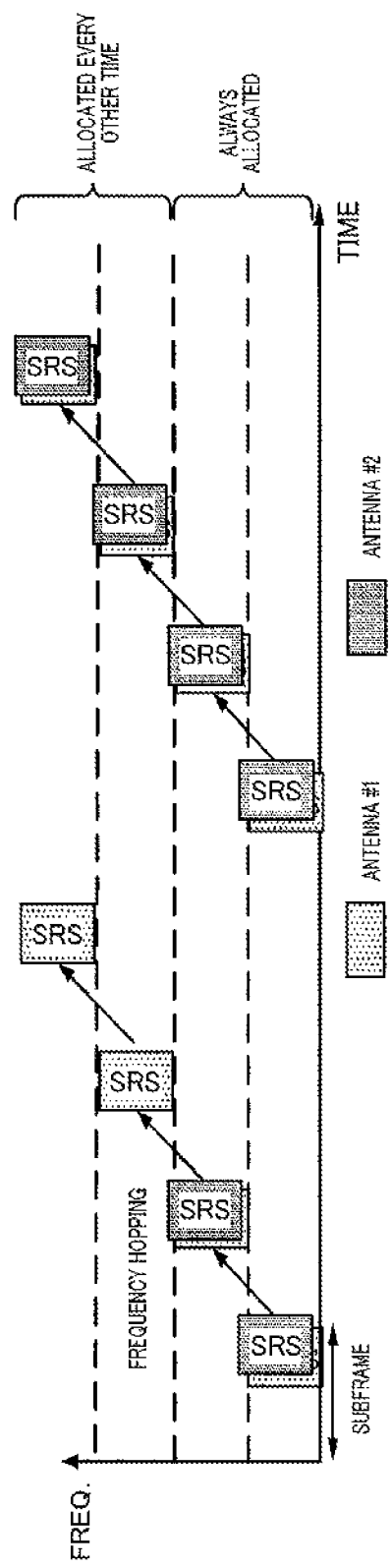
FIG. 13 is a diagram illustrating SRS hopping pattern 6 according to Embodiment 4 of the invention.

FIG. 13 is a diagram illustrating SRS Hopping Pattern 6. As shown in FIG. 13, in SRS Hopping Pattern 6, the SRS hopping pattern applied to the second antenna (antenna #2) is switched per hopping pattern application cycle, SRS Hopping Pattern 6 has a mixture of the application cycle in which the same SRS hopping pattern as in the first antenna is applied and the application cycle in which the SRS hopping pattern formed of a part of elements forming the SRS hopping pattern applied to the first antenna is applied.

In FIG. 13, in the first application cycle, the SRSs are transmitted only in the first partial band and the second partial hand. On the other hand, in the second application cycle, the SRSs are transmitted in all of the first to fourth partial bands.

Using this SRS hopping pattern allows the antennas of terminal 200 to have different numbers of SRS transmissions. The number of SRS transmissions from the second antenna may be made to vary among a plurality of partial bands.

In the partial bands at both ends of the frequency band allocated to terminal 200, the SRS may always be transmitted from the primary antenna, and the number of SRS transmissions from the other antennas may be reduced. In the frequency band at both ends, it is possible to measure the reception quality using the pilot signal transmitted for the control information. Accordingly, it is possible to calculate the reception quality of the partial band having a smaller number of transmissions through interpolation using the reception quality measured from the pilot signal and the reception quality measured in the partial band frequency having a large number of transmissions.

Other Embodiments

Figure 14:
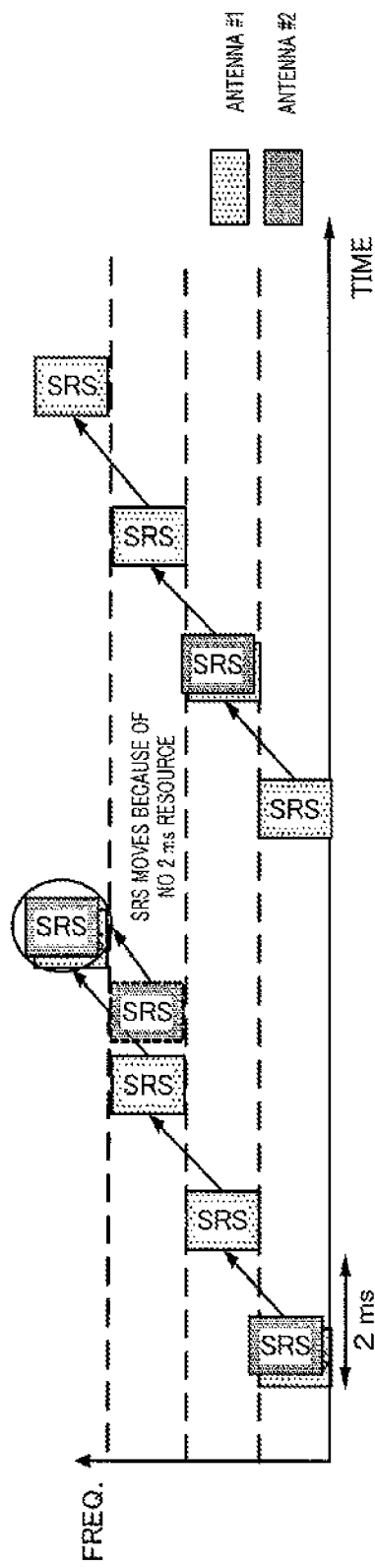
FIG. 14 is a diagram illustrating an additional embodiment of the invention.

In Embodiment 1, the condition that "the elements of the SRS hopping pattern applied to the secondary antenna are a part of the elements forming the reference pattern" may not be satisfied depending on the relationship between the transmission interval of the reference pattern and the transmission interval of the SRS hopping pattern applied to the secondary antenna. For example, as shown in FIG. 14, when the transmission interval of the reference pattern is 2 ms (that is, the SRS is transmitted at 2, 6, 8, and 10 ms) and the transmission interval of the SRS hopping pattern applied to the antenna other than the primary antenna is 5 ms (that is, the SRS is transmitted at 5 and 10 s), no SRS transmission resource is present at 5 ms in the reference pattern. Accordingly, when the SRS hopping pattern applied to the secondary antenna is used without any change, the above-mentioned condition is not satisfied.

As a first method for avoiding this situation, the transmission interval of the SRS hopping pattern applied to each transmitting antenna is set to only an integer multiple of the transmission interval of the reference pattern.

As a second method, the SRS is not transmitted (that is, dropped) in a subframe corresponding to the elements, which do not satisfy the above-mentioned condition, of the SRS hopping pattern applied to each antenna.

As a third method, the SRS is not transmitted in the subframe corresponding to the elements, which do not satisfy the above-mentioned condition, of the SRS hopping pattern applied to each antenna, but the SRS is transmitted in a subframe which corresponds to the elements forming the reference pattern and which is closest to the subframe. For example, as shown in FIG. 14, when the transmission interval of the SRS hopping pattern applied to the antenna other than the primary antenna is 5 ms, the SRS is not transmitted with the SRS resource corresponding to 5 ms, but is transmitted with the SRS resource (4 ms or 6 ms) previous or subsequent to the SRS resource. The subframe in which the SRS is transmitted may be set to a subframe positioned before and closest to the subframe corresponding to the elements not satisfying the condition or a subframe positioned subsequent to and closest to the subframe.

(2) The SRS hopping patterns described in the above-mentioned embodiments may be used singly or may be used while being switched.

For example, SRS Hopping Pattern 1 is used in a first mode in which the SRS is transmitted from all the antennas of terminal 200 at the same time and the same frequency position. Each antenna independently uses an SRS hopping pattern, similarly to SRS Hopping Pattern 3, in a second mode in which the SRS is transmitted from all the antennas of terminal 200 at different transmission timings and different frequency positions.

Accordingly, the advantages of both modes can be utilized. That is, in the second mode, since the SRS is transmitted from a plurality of antennas with independent resources, it is possible to efficiently and flexibly utilize unused resources. In the first mode, since the SRS is transmitted from a plurality of antennas with the same resources, the measurement error of reception quality due to a difference in timing and frequency is small. Accordingly, it is possible to achieve a highly-precise setting in setting weights in the MIMO communication or the like.

(3) The above embodiments have been described using a periodic SRS whose transmission timing and the like are notified by an upper layer. However, the invention is not limited to this configuration, and the periodic SRS may be replaced with a dynamic aperiodic SRS notified by the PDCCH (Physical Downlink Control Channel) or the like. When the dynamic aperiodic SRS is transmitted in a long period, the same advantages as in the invention can be achieved.

(4) It is stated above in the above-mentioned embodiments that the primary antenna (for example, an antenna used in the non-MIMO communication mode) is set to antenna #1 and the secondary antenna (for example, an antenna additionally used in the MIMO communication mode) is set to antenna #2, but the invention is not limited to this configuration. For example, antennas #1 and #2 may be used as the primary antennas and antennas #3 and #4 may be used as the secondary antennas.

(5) The above-mentioned embodiments are applied to antennas, but the invention may be likewise applied to an antenna port.

The antenna port means a logical antenna including one or more physical antennas. That is, the antenna port does not necessarily mean one physical antenna, but may mean an antenna array including a plurality of antennas or the like.

For example, in 3GPP LTE, the number of physical antennas included in the antenna port is not defined, but the antenna port is defined as the minimum unit through which a base station can transmit a different reference signal.

The antenna port may be defined as the minimum unit for multiplying a weight of a precoding vector.

(6) it is stated in the above-mentioned embodiments that the invention is implemented by hardware, but may be implemented by software in cooperation with hardware.

The functional blocks described in the above-mentioned embodiments are typically realized as an LSI, which is an integrated circuit. The functional blocks may be implemented by individual chips, or all or a part thereof may be implemented by a single chip. Although the LSI is mentioned herein, terms such as an IC, a system LSI, a super LSI, and an ultra LSI may be used depending on the degree of integration.

The circuit integration technique is not limited to the LSI, but the integration may be implemented by a dedicated circuit or a general-purpose processor. It is also possible to use an FPGA (Field Programmable Gate Array) programmable after manufacturing an LSI or a reconfigurable processor which can reconstruct the connection or setting of circuit cells in an LSI after manufacturing the LSI.

If integration techniques which can take the place of the LSI emerge with advancement of semiconductor techniques or other techniques derived therefrom, the functional blocks may be integrated using the techniques. For example, biological techniques may be used.

The details disclosed in the specification, the drawings, and the abstract of Japanese Patent Application No. 2010-105321, filed on Apr. 30, 2010, are incorporated herein by reference in its entirety.

INDUSTRIAL APPLICABILITY

The transmission apparatus, the reception apparatus, the transmission method, and the notification method according to the invention are useful since they are capable of limiting a decrease in the following capability of temporal variation of a channel and limiting an increase in SRS resources.

REFERENCE SIGNS LIST

100: BASE STATION
101: SETTING SECTION
102: PILOT PROCESSING SECTION
103, 104, 105: ENCODING AND MODULATION SECTION
106: MULTIPLEXING SECTION
107, 213: IFFT SECTION
108, 214: CP ADDING SECTION
109, 215: TRANSMISSION SECTION
110, 201: ANTENNA
111, 202: RECEPTION SECTION
112, 203: CP REMOVING SECTION
113, 204: FFT SECTION
114: EXTRACTION SECTION
115: FREQUENCY EQUALIZING SECTION
116: IDFT SECTION
117: DATA RECEPTION SECTION
118: ACK/NACK RECEPTION SECTION
121: PDCCH INFORMATION SETTING SECTION
122: UPPER LAYER INFORMATION SETTING SECTION
200: TERMINAL
205: DEMULTIPLEXING SECTION
206: SETTING INFORMATION RECEPTION SECTION
207: PDCCH RECEPTION SECTION
208: PDSCH RECEPTION SECTION
209, 210: MODULATION SECTION
211: DFT SECTION
212: MAPPING SECTION
216: PILOT GENERATING SECTION

The invention claimed is:

1. A transmission apparatus that comprises a plurality of antennas and transmits a reference signal from each of the plurality of antennas, the transmission apparatus comprising:
a mapping section configured to map the reference signal to a time-frequency resource on the basis of a hopping pattern of the reference signal; and
a transmission section configured to transmit the mapped reference signal, wherein
in the hopping pattern, the number of transmissions of the reference signal from a first antenna out of the plurality of antennas is larger than the number of transmissions of the reference signal from a second antenna out of the plurality of antennas; and
in the hopping pattern, both a transmission timing and a frequency position of the reference signal transmitted from the second antenna are matched with both a transmission timing and a frequency position of the reference signal transmitted from the first antenna.

2. The transmission apparatus according to claim 1, wherein the hopping pattern for the second antenna is changed every determined cycle.

3. The transmission apparatus according to claim 1, wherein, the hopping pattern includes a mixture of a transmission period in which the reference signal is transmitted continuously in a plurality of subframes from the second antenna and a non-transmission period in which the reference signal is not transmitted in a plurality of subframes.

4. The transmission apparatus according to claim 1, wherein, in the hopping pattern, the number of transmissions of the reference signal from the second antenna varies depending on a frequency band.

5. A reception apparatus that receives reference signals transmitted via a plurality of antennas from a transmission apparatus, the reception apparatus comprising:
a setting section configured to set a hopping pattern of each of the reference signals for the transmission apparatus; and
a transmission section configured to transmit information on the set hopping pattern to the transmission apparatus, wherein,
in the hopping pattern, the number of transmissions of the reference signal from a first antenna out of the plurality of antennas is larger than the number of transmissions of the reference signal from a second antenna out of the plurality of antennas; and
in the hopping pattern, both a transmission timing and a frequency position of the reference signal transmitted from the second antenna are matched with both a transmission timing and a frequency position of the reference signal transmitted from the first antenna.

6. A transmission method for transmitting reference signals from a plurality of antennas, the method comprising: transmitting the reference signals mapped to time-frequency resources on the basis of hopping patterns of the reference signals, the hopping patterns being set so that the number of transmissions of the reference signal from a first antenna out of the plurality of antennas is larger than the number of transmissions of the reference signal from a second antenna out of the plurality of antennas and so that both a transmission timing and a frequency position of the reference signal transmitted from the second antenna are matched with both a transmission timing and a frequency position of the reference signal transmitted from the first antenna.

7. A notification method for notifying information on reference signals transmitted via a plurality of antennas from the counterpart communication apparatus, the method comprising: transmitting, to the counterpart communication apparatus, information on hopping pattern which is set so that the number of transmissions of the reference signal from a first antenna out of the plurality of antennas is larger than the number of transmissions of the reference signal from a second antenna out of the plurality of antennas and so that both a transmission timing and a frequency position of the reference signal transmitted from the second antenna are matched with both a transmission timing and a frequency position of the reference signal transmitted from the first antenna.

* * * * *